US011258725B2

(12) United States Patent
Pol et al.

(10) Patent No.: US 11,258,725 B2
(45) Date of Patent: *Feb. 22, 2022

(54) DISTRIBUTED STREAM-BASED DATABASE TRIGGERS

(71) Applicant: Amazon Technologies, Inc., Seattle, WA (US)

(72) Inventors: Parikshit Shivajirao Pol, Seattle, WA (US); Subramanian Sankara Subramanian, Seattle, WA (US); Rajaprabhu Thiruchi Loganathan, Issaquah, WA (US); Rama Krishna Sandeep Pokkunuri, Seattle, WA (US); Gopinath Duddi, San Jose, CA (US); Akshat Vig, Seattle, WA (US); Safeer Mohiuddin, Saratoga, CA (US); Sudarshan Narasimhan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/880,740

(22) Filed: May 21, 2020

(65) Prior Publication Data

US 2020/0287841 A1    Sep. 10, 2020

Related U.S. Application Data

(63) Continuation of application No. 14/868,236, filed on Sep. 28, 2015, now Pat. No. 10,666,574.

(51) Int. Cl.
*G06F 16/30* (2019.01)
*H04L 47/70* (2022.01)
(Continued)

(52) U.S. Cl.
CPC ............ *H04L 47/822* (2013.01); *G06F 9/505* (2013.01); *G06F 11/3433* (2013.01);
(Continued)

(58) Field of Classification Search
CPC ............ G06F 11/3006; G06F 11/3433; G06F 11/3476; G06F 16/137; G06F 16/24565;
(Continued)

(56) References Cited

U.S. PATENT DOCUMENTS

| 5,761,507 A | 6/1998 | Govett |
| 6,192,365 B1 * | 2/2001 | Draper .................... G06F 9/466 707/648 |

(Continued)

FOREIGN PATENT DOCUMENTS

| CN | 1871586 A | 11/2006 |
| CN | 102682052 A | 9/2012 |

(Continued)

OTHER PUBLICATIONS

Australian Examination Report No. 1, dated Jan. 25, 2019, Patent Application No. 2016332576, filed Sep. 26, 2016, 5 pages.
(Continued)

*Primary Examiner* — Mahesh H Dwivedi
(74) *Attorney, Agent, or Firm* — Davis Wright Tremaine LLP

(57) ABSTRACT

Information describing changes to a collection of items maintained by a database may be stored in a log file. The information in the log file may be converted into a stream of records describing the changes. The records may be directed to a computing node selected for performing a trigger function in response to the change, based on applying a hash function to a portion of the record, identifying a hash space
(Continued)

associated with a value output by the hash function, and mapping from the hash space to the selected computing node.

19 Claims, 10 Drawing Sheets

(51) Int. Cl.
*G06F 16/13* (2019.01)
*G06F 16/901* (2019.01)
*G06F 16/2455* (2019.01)
*G06F 9/50* (2006.01)
*G06F 11/34* (2006.01)
*G06F 16/23* (2019.01)
*H04L 43/065* (2022.01)
*G06F 11/30* (2006.01)

(52) U.S. Cl.
CPC ........ *G06F 11/3476* (2013.01); *G06F 16/137* (2019.01); *G06F 16/23* (2019.01); *G06F 16/24565* (2019.01); *G06F 16/9014* (2019.01); *H04L 43/065* (2013.01); *G06F 11/3006* (2013.01); *G06F 2201/80* (2013.01); *G06F 2209/508* (2013.01)

(58) Field of Classification Search
CPC ............. G06F 16/9014; G06F 2201/80; G06F 2209/508; G06F 9/505; H04L 43/065; H04L 47/822
See application file for complete search history.

(56) References Cited

U.S. PATENT DOCUMENTS

| | | | |
|---|---|---|---|
| 6,374,236 B1* | 4/2002 | Chen | G06F 16/24532 |
| 8,595,267 B2 | 11/2013 | Sivasubramanian et al. | |
| 8,719,415 B1 | 5/2014 | Sirota et al. | |
| 8,898,120 B1* | 11/2014 | Efstathopoulos | G06F 16/11 707/692 |
| 2007/0203910 A1* | 8/2007 | Ferguson | G06F 16/27 |
| 2007/0226171 A1 | 9/2007 | Medicke et al. | |
| 2008/0007765 A1 | 1/2008 | Ogata et al. | |
| 2010/0017442 A1 | 1/2010 | Kaijima et al. | |
| 2010/0318827 A1 | 12/2010 | Shah et al. | |
| 2012/0158679 A1* | 6/2012 | Anderson | G06F 16/24565 707/702 |
| 2012/0271857 A1* | 10/2012 | Chasman | G06F 16/273 707/791 |
| 2013/0031067 A1* | 1/2013 | Iyer | G06F 21/64 707/703 |
| 2014/0310418 A1 | 10/2014 | Sorenson, III et al. | |
| 2014/0317087 A1* | 10/2014 | Collins | G06F 16/2255 707/715 |
| 2015/0058316 A1 | 2/2015 | Bruno et al. | |
| 2015/0134795 A1* | 5/2015 | Theimer | G06F 16/254 709/223 |
| 2015/0169648 A1* | 6/2015 | Foebel | H04L 67/42 707/609 |
| 2015/0324359 A1* | 11/2015 | Luo | G06F 16/24578 707/740 |
| 2016/0134684 A1* | 5/2016 | Tan | H04L 67/06 709/217 |
| 2017/0060900 A1 | 3/2017 | Marinov et al. | |

FOREIGN PATENT DOCUMENTS

| | | | | |
|---|---|---|---|---|
| EP | 1022663 A2 * | 7/2000 | ....... | G06F 16/24565 |
| JP | 2008015888 A | 1/2008 | | |
| JP | 2010026744 A | 2/2010 | | |
| WO | 2014200440 A1 | 12/2014 | | |

OTHER PUBLICATIONS

Australian Notice of Acceptance, dated Oct. 22, 2019, Patent Application No. 2016332576, filed Sep. 26, 2016, 3 pages.
Canadian Notice of Allowance for Patent Application No. 3000161, dated Feb. 17, 2020, 1 page.
Canadian Notice of Allowance dated Jan. 4, 2021, Patent Application No. 3000161, 1 page.
Canadian Office Action dated Jan. 28, 2019, Patent Application No. 3000161, filed Sep. 26, 2016, 4 pages.
Cruz et al., "MeT: Workload aware elasticity for NoSQL," Computer Systems, ACM, Apr. 2013, 14 pages.
Dai et al., "Sedna: A Memory Based Key-Value Storage System for Realtime Processing in Cloud," IEEE International Conference on Cluster Computing Workshops, Sep. 2012, 9 pages.
European Communication under Rule 71(3) EPC dated Apr. 4, 2019, Patent Application No. 16778615.1, filed Sep. 26, 2016, 44 pages.
Indian First Examination Report dated Sep. 30, 2020, Patent Application No. 201817015137, 6 pages.
International Search Report and Written Opinion, dated Jan. 31, 2017, International Patent Application No. PCT/US2016/053822, filed Sep. 26, 2016, 12 pages.
Japanese Decision to Grant, dated Oct. 15, 2019, Patent Application No. 2018-515775, filed Sep. 26, 2016, 3 pages.
Japanese First Office Action, dated Feb. 12, 2019, Patent Application No. 2018-515775, filed Sep. 26, 2016, 4 pages.
Oracle7 Server Concepts Manual, "Database Triggers," Jul. 15, 2013, retrieved Jul. 9, 2019, from https://web.archive.org/web/20130715192206/https://docs.oracle.com/cd/A57673_01 /DOC/server/doc/SCN73/ch 15.htm, 12 pages.
Vogels, "Embrace event-driven computing: Amazon expands DynamoDB with streams, cross-region replication, and database triggers," Jul. 14, 2015, retrieved July 9, 2019, from https://www.allthingsdistributed.com/2015/07/dynamodb-streams.html, 4 pages.
Chinese First Office Action dated Oct. 9, 2021, Patent Application No. 201680064622.8, 6 pages.
Yu et al., "A Heuristic Data Allocation Method for Multi-tenant SaaS Application in Distributed Database Systems," 2011 International Conference on Information Management, Innovation, Management and Industrial Engineering, Dec. 29, 2011.
Zhou et al., "Progress of Big Data Storage Technology," Scientific Research Information Technology and Application 6(1):18-28, Jan. 20, 2015.

* cited by examiner

DISTRIBUTED STREAM-BASED DATABASE TRIGGERS

CROSS-REFERENCE TO RELATED APPLICATION

This application claims priority to and is a continuation of U.S. patent application Ser. No. 14/868,236, filed Sep. 28, 2015, entitled "DISTRIBUTED STREAM-BASED DATABASE TRIGGERS," which is incorporated by reference for all purposes.

BACKGROUND

A database trigger typically comprises instructions that are executed in response to an event that has occurred on the database. A database trigger may, for example, be associated with a table maintained by a database management system and executed whenever an insert, update, or delete command is performed on the table. Triggers may be used for various purposes, such as validating data, maintaining relational integrity, and other functions. Conventional approaches to implementing database triggers may involve the database management system storing the trigger definitions and executing the triggers when an applicable event occurs.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Figure 1:
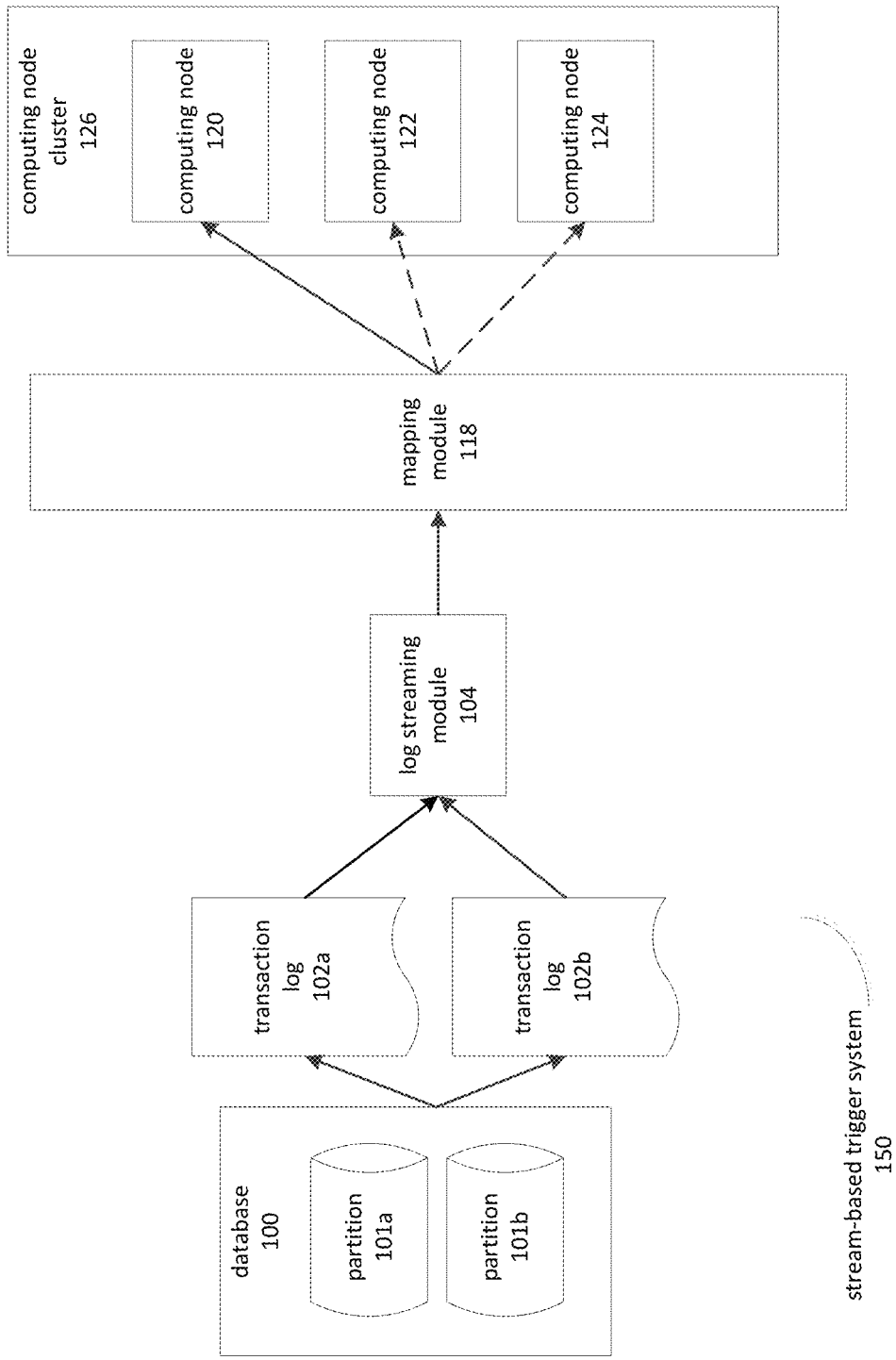
FIG. 1 is a diagram depicting a distributed stream-based trigger system.

Disclosed herein are systems, methods, and computer program products for providing a scalable trigger service for hosted database systems. A trigger, or trigger function, may be a set of instructions that are performed in response to an event that occurs on a database management system. For example, a database management system may maintain a collection of items, one example being a database table comprising various items, or rows. When an item is inserted into the table or an existing item is modified, a trigger function might be invoked to perform various related operations. For example, when an item is inserted or modified, a trigger function might be invoked to validate the item, detect unusual access patterns, and other tasks. Validating the item may include functions such as range checking. Detecting unusual access patterns may involve examining relationships between updates, calculating metrics related to update frequency, and so on.

In a hosted database system, a customer of the hosting service may wish to employ trigger functions. However, hosted database services may be multi-tenant, meaning that more than one customer may be served by a given database management system. As a result, some conventional approaches to triggers, such as those in which the trigger function is executed by the database management system, may be inappropriate for a multi-tenant system. Executing a trigger function on behalf of one tenant may, for example, consume resources needed by another tenant.

A hosted database system may also be scalable. Additional computing nodes, sometimes referred to as shards, may be added to the system to accommodate larger workloads or data sets. As disclosed herein, a system for performing trigger functions may also be made scalable. The scaling mechanism, moreover, may be independent of the nodes used to scale the storage and workload capabilities of the database. In other words, computing capability may be directed to performing trigger functions when required, independently of the capabilities of the database management system.

In an example, a distributed database management system may maintain a collection of items. When the database management system processes a request to store an item in the collection, it does so by first writing a log file describing the request to a log file. By doing so, the database management system may cause the requested change to become durable. In the event of a system failure, the log file may be accessed and the information used to process requests that were pending when the failure occurred. The log file may also be used as a data source for a stream of information describing events related to the collection of data. Data in the log file may correspond to a particular hash space. This may occur as a consequence of partitioning—the database that generates the log file may correspond to a hash-based partition of a table.

A first group of computing nodes may be configured to process the trigger functions. The configuration may involve uploading a definition of the function to computing nodes in the first group. The definition may, for example, be supplied as a script file uploaded from a client device of a customer of the service. When requesting upload of the script, the customer might also provide, to the client device, an indication of which collection of items the script applies to. For example, the customer might wish to upload one set of trigger function definitions for a first table, and a second set of trigger functions for a second table. In some cases, the script might be associated with a particular hash space or partition. In some instances, the hash space may correspond to the partition.

A second computing node, which may be one of the first group of computing nodes or external to it, may receive records read from the database log file. One of the records, for example, might correspond to request to store an item in the collection of items. The record might include information such as the primary key of an item and two sets of values. One of the sets of values might be values for the item prior to the request, and the other set might be values for the item after the request was processed by the database management system.

The second computing node may monitor the resource utilization of the first group of computing nodes. Based on the utilization, a computing node from the first group may be selected for processing the trigger function. The second computing node may transmit instructions to the selected computing node indicating that the trigger function should be performed. The instructions may also include information, such as the primary key of the item and the sets of old and new values. The first computing node may then execute the trigger function using the supplied information as parameters.

FIG. 1 is a diagram depicting a distributed stream-based trigger system 150. The stream-based trigger system 150 may be scalable to different workloads by the addition of a computing node to the one or more computing nodes 120-124 of a computing node cluster 126. As described herein, a computing node includes a computing device comprising a processor and a memory, and may also comprise virtualization components permitting a plurality of computing nodes to share a computing device. The computing node cluster 126 may in some instances, comprise an association of the computing nodes 120-124 in the computing node cluster 126. In some cases, the computing node cluster 126 may also comprise hardware components such as dedicated communications infrastructure and storage area networks to facilitate communication between the computing nodes 120-124 in the computing node cluster 126.

A database 100 may be a distributed database that maintains collections of items. An item, as used herein, may refer to related sets of information such as a row of a database table, a set of values, and so forth. Typically, an item is associated with a uniquely identifying value, or set of values, sometimes referred to as a primary key.

The collections of items may be maintained on partitions 101a and 101b. A partition may contain a subset of items corresponding to a range of data. For example, the items in a larger collection of data might be horizontally partitioned based on their primary key values. This may be done by application of a hash function to the primary key values. The hash values output by application of the hash function may be mapped to hash spaces, and these may in turn may be mapped to partitions 101a, 101b.

The database 100 may process requests to store and item in the collection of items. As used herein, storing data may refer to modifications to the memory and storage structures maintained by the database 100. As used herein, storing an item may relate to inserting, updating, or modifying the item.

The database 100 may store information indicative of the request to update the item in a transaction log, such as one of the depicted transaction logs 102a, 102b. The transaction logs 102a, 102b may include one or more files maintained on a storage device. Each of the partitions 101a, 101b may write data to a transaction log 102a, 102b. The information indicative of the request may, in some instances, be written prior to the database 100 updating its memory and storage structures to reflect the changes indicated by the request to update the item. This approach may ensure that the change is durable in the event of system failure, since the request can be recovered from a transaction log 102a, 102b if the database 100 should cease executing prior to the request to update the item being fully processed. A transaction log entry may also be used to replicate data to other database instances. In addition, as described herein, a transaction log 102a, 102b may be used by the stream-based trigger system 150 as a source of data. The entries in a transaction log 102a, 102b may be provided as a stream of data indicative of updates made to the collection of items in the database 100. The data in the stream may act as triggering conditions in response to which various operations may be performed by computing nodes 120-124 of the computing node cluster 126.

A log streaming module 104 may read information from the transaction logs 102a, 102b and write the information to an input/output stream for processing. The log streaming module 104 may, in some cases, obtain the information directly from a transaction log 102a, 102b. In other cases, the log streaming module 104 may obtain the information from a replicated copy, or subset, of a transaction log 102a, 102b. The log streaming module 104 may, in some instances, filter the subset of entries from a transaction log 102a, 102b that it will write to the input/output stream.

The log streaming module 104 may read from one or more of the transaction logs 102a, 102b. In some cases, the log streaming module 104 may extract and reorder data from multiple log files 102a, 102b in order to produce a chronologically ordered stream of data. Note that in some cases, partitions may be associated with a lineage in which a parent partition is associated with one or more child partitions. The log streaming module 104 may obtain and utilize knowledge of partition lineage to reconstruct a stream of events in the order they occurred, even if records of the events are stored in different log files.

Typically, a given transaction log 102a, 102b may correspond to a particular hash space. This may be a consequence of each partition 101a and 101b being associated with a particular hash space. Accordingly, the input to log streaming module 104 may consist of a stream of information indicative of updates to items that fall within a particular hash space.

A record from the stream may be indicative of a request to update an item in the collection of items maintained by one of the partitions 101a, 101b. The record may contain data such as the primary key of the item, the item's previous values, and the item's new values.

The mapping module 118 may process the stream of information from the log streaming module 104. The mapping module 118 may process the stream of information by examining each record of a request to store data in a collection of items and determining how the record should be handled. The mapping module 118 may determine that a request to store data in the collection of items should be processed by a trigger function, using the capabilities of the computing node cluster 126.

The mapping module 118 may monitor resource utilization of the computing nodes 120 of the computing node cluster 126. The monitoring may consist of tracking input/output utilization, central-processing unit ("CPU") utilization, and so on. The mapping module 118 may receive the utilization information from performance tracking components operative on the computing nodes 120 of the computing node cluster 126.

The mapping module 118 may determine that a particular node, of the computing nodes 120-124 in the computing node cluster 126, should perform a trigger function based on the information received from the stream. The determination may be based on the selected computing node—for example, the depicted computing node 120—being less heavily utilized than at least one of the other computing nodes 122-124 in the computing node cluseter 126. In some cases, the mapping module 118 may also consider previous processing performed by a computing node 120-124 of the computing node cluster 126. For example, the mapping module 118 might ensure that, for a given item, all updates corresponding to the item are processed on the same computing node 120. This may, in some cases, be done by applying an additional hash function and hash space mapping, so that all items that are mapped to a particular hash space are routed to the same computing node 120.

Figure 2:
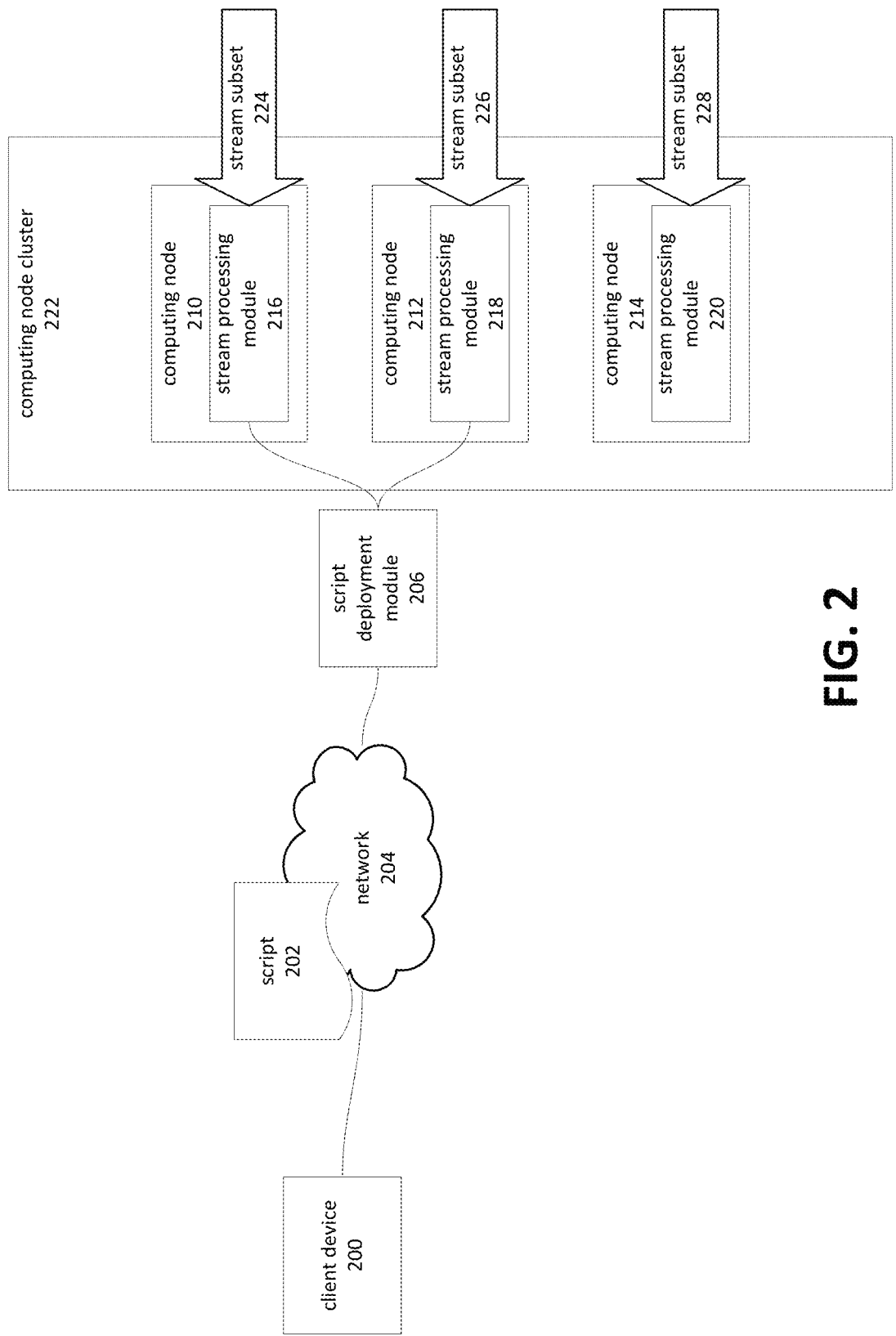
FIG. 2 is a diagram depicting a system for processing stream-based trigger functions.

FIG. 2 is a diagram depicting a system for processing stream-based trigger functions. A client device 200 may provide a set of instructions, such as a script 202, via network 204 to a script deployment module 206. The set of instructions may be referred to as a trigger function. The trigger function may be invoked on one of the computing nodes 210-214 of the computing node cluster 222 in order to respond to an update event. Upon receiving the set of instructions for the trigger function, the script deployment module 206 may identify one or more computing nodes 210 and 212 that may be used to process events from a database transaction log, such as the transaction log 102 of database 100 depicted in FIG. 1.

The script 202 may be transmitted from the script deployment module 206 to one or more of the computing nodes 210-214 of the computing node cluster 222. The script may then be stored on the computing nodes selected for performing the trigger function (for example, computing nodes 210 and 212). The number of computing nodes selected for performing the trigger function may be based on factors such as the workload and capacity utilization of the computing nodes 210-214.

A stream processing module 216-220 on each of the computing nodes 210-214 may maintain access to each script and provide for the invocation of the triggering function the script defines. For example, the stream processing module 216 might maintain an association between a category of events, such as those related to a particular collection of items, and the script 202 and/or the trigger function the script 202 defines. The stream processing module 216 might read incoming events from its associated stream subset 224, and evaluate the trigger function defined by the script 202. The stream processing module 216 may cause the set of instructions that are included in the script 202 and make up the trigger function to be performed. The stream processing module 216 may provide the trigger functions with parameters. For example, the stream processing module 216 may obtain the primary key, old values, and new values corresponding to an update event in the stream subset 224, and supply the primary key, old values, and new values as parameters to the trigger function (or functions) that are applicable to the event. In some instances, an event read from a stream, such as stream subset 224, may correspond to a plurality of trigger functions. The stream processing module 216 may, upon receiving an event from the stream subset 224, invoke each of the plurality of trigger functions that is associated with the event.

The stream processing modules 216-220 may each receive a corresponding stream subset 224-228 of events. The set of events that each of the stream processing modules 210-214 receives can, in some cases, be restricted to a subset of events occurring on the database. The subset may be determined based on the application of filter criteria by the log streaming module 104, and by the operation of the mapping module 118, as depicted in FIG. 1, which may transmit events to a stream processing module 216-220 based on the hash value obtained by mapping module 118 and the hash space mapping 118. With reference to FIG. 1, the connecting lines between the hash spaces 108-116 and computing nodes 120-124 may correspond to streams that supply input to the stream processing modules 216-220.

Figure 3:
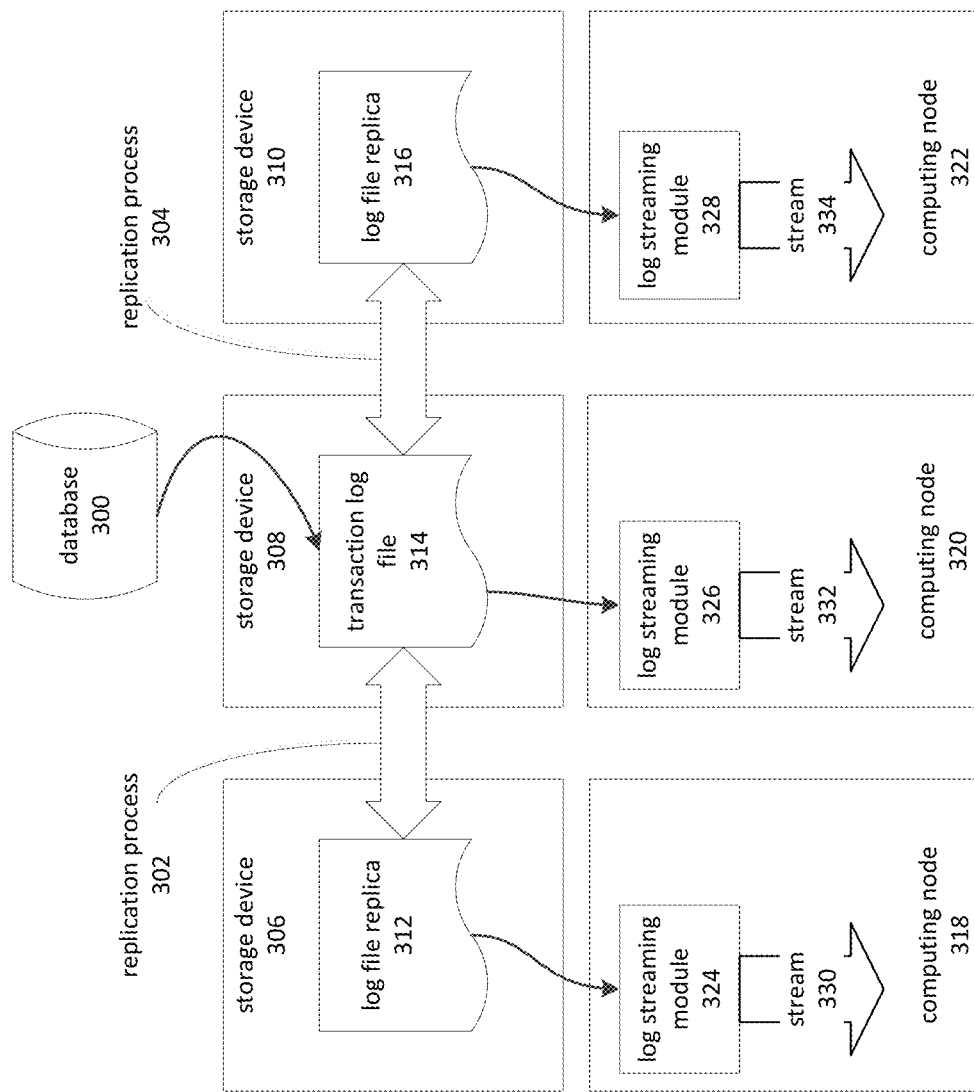
FIG. 3 is a diagram depicting replication and streaming of a database log file.

FIG. 3 is a diagram depicting replication and streaming of a database log file. A database 300 may store information in a transaction log file 314 on a storage device 308. The information in the transaction log file 314 may comprise information indicative of requests to update various items in a collection of items. A log streaming module 326, as a component of computing node 320, may access the information in the transaction log file 314 and form a stream 332 of events corresponding to the requests to update items in the collection of items.

In various instances, the original transaction log file 314 may be replicated to other storage devices 306 and 310, forming log file replicas 312 and 316. The database 300 may, in some cases, be designated a master with respect to other databases which replicate the contents of database 300 and, in turn, produce their own respective log files. In other cases, the translation log file 314 may be copied, in whole or in part, to form the log file replicas 312 and 316. The streaming modules 324 and 328, as components of computing nodes 318 and 322, may read log file replicas 312 and 316, respectively, to form corresponding streams 330 and 334. The log file replicas 312 and 316 may be used to process trigger functions on replicated databases, or used as a means of further scaling processing of the trigger functions.

The replication processes 302 and 304 may be configured to transfer a subset of the contents of the transaction log file 314 to the log file replicas 312 and 316. This may be done for various reasons, including reducing the amount of data to be transferred and to increase the efficiency of the streaming modules 324 and 328.

Figure 4:
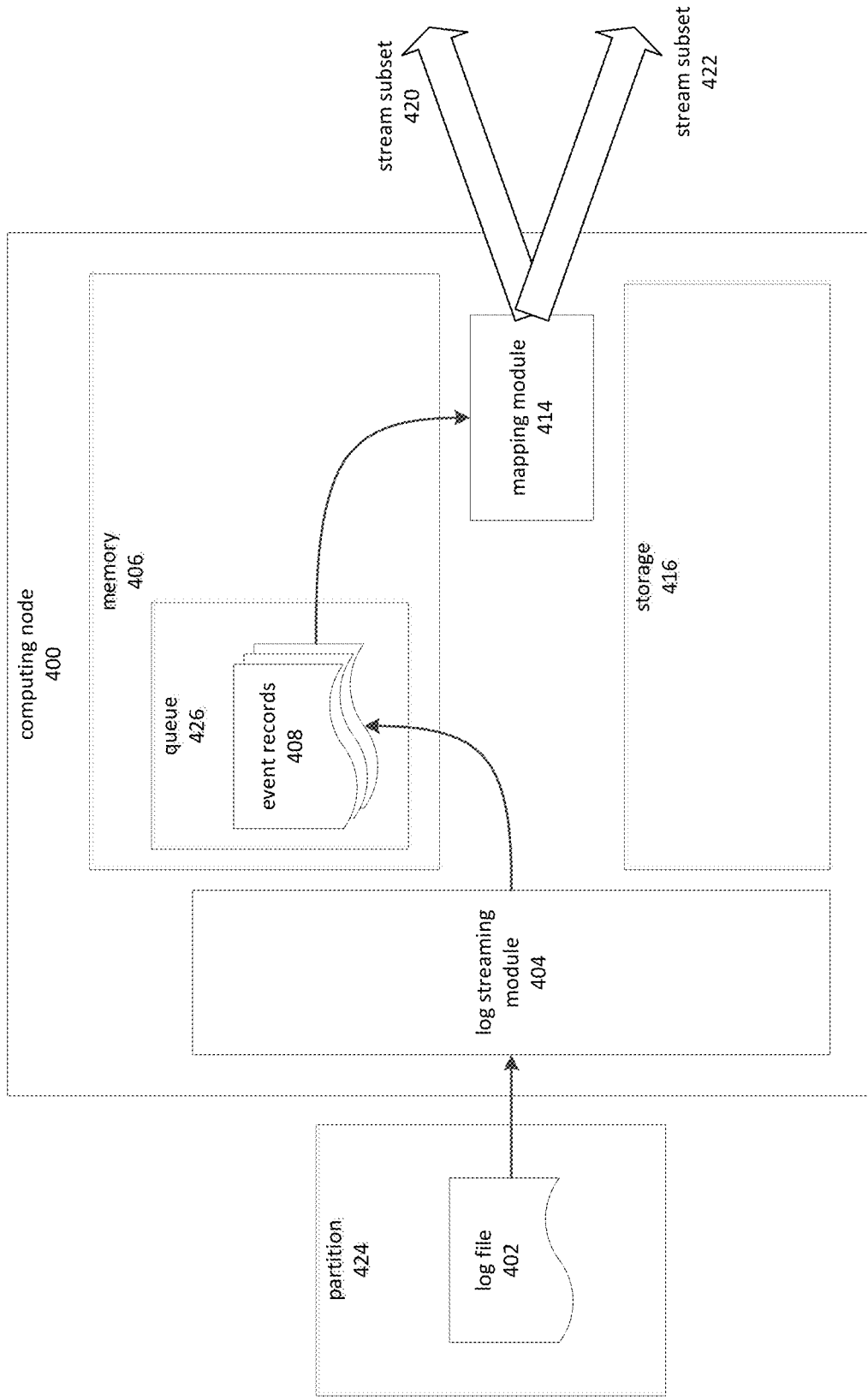
FIG. 4 is a diagram depicting a computing node configured as a transmitter of streams of log file events.

FIG. 4 is a diagram depicting a computing node configured as a transmitter of streams of log file events. The computing node 400 may comprise a log streaming module 404 and a mapping module 414. The log reader module 404 reads data from a log file 402 and places event records 408 into a memory 406 of the computing node 400. The log file 402 may be read from a storage device associated with a partition 424. The mapping module 414 may determine which of the stream subsets 420-422 should be used to stream the update to a computing node that is to perform the trigger function. The mapping module 414 may base the determination on factors such as the utilization level of the selecting computing node. The utilization level may, in some cases, be compared to that of other computing nodes in a cluster of nodes that are configured to perform the trigger function.

The log streaming module 404 may place event records 408 into a queue 426 maintained in memory 406. In some instances, the queue 426 may be backed by a persistent storage mechanism, such as the storage device 416 depicted in FIG. 4. The queue 426 may be operated as or similar to a first-in, first-out ("FIFO") queue. Typically, the order in which updates are applied to a collection of items is to be preserved.

The stream subsets 420-422 may also comprise queue structures. In some instances, these structures may be contained in the memory 406 of the computing node 400. In other instances, the queue structures may be maintained on another computing node. Referring back to FIG. 1, each of computing nodes 120-124 might contain a queue structure (not shown) for retaining events corresponding to a particular stream subset. For example, again referring to FIG. 1, hash spaces 108 and 110 might correspond to a stream subset that is directed to computing node 120. The queue structure, in this case, may be maintained in a memory and/or persistent storage device of computing node 120.

The ordering of the queues (not shown) of the stream subsets may also be FIFO. However, note that each of the stream subsets 420-422 may correspond to non-overlapping subsets of the stream of records placed by the log streaming module 404 into the queue 426 in memory 406. The mapping module 414 operates so that, for a given item in a collection, all updates pertaining to the item are directed to the same stream subset 420 or 422. Accordingly, in each of stream subsets 420-422, the ordering of events with respect to individual items is preserved.

Figure 5:
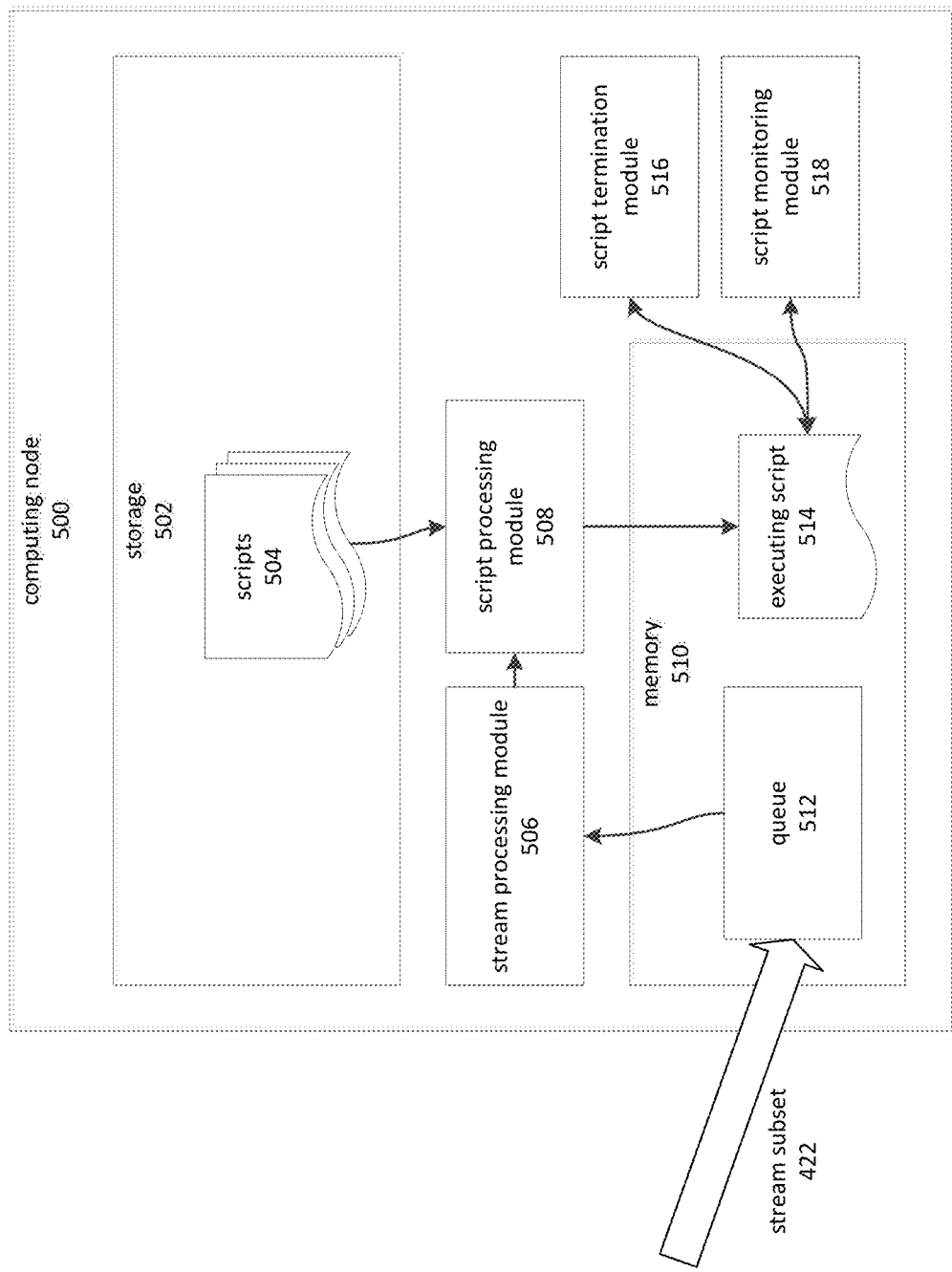
FIG. 5 is a diagram depicting a computing node configured as an executor of trigger functions.

FIG. 5 is a diagram depicting a computing node configured as an executor of trigger functions. A queue 512 may be maintained in the memory of computing node 500. The queue 512 may contain records of events corresponding to one of the stream subsets 420 or 422 that are depicted in FIG. 4. For exemplary purposes, the events may be presumed to be from stream subset 422, as depicted in FIG. 5.

The stream processing module 506 may read a record from the queue 512 and invoke a method of a script processing module 508, to which is supplied information about the event such as the primary key of the updated item, prior values of the item, and new values of the item. The script processing module 508 may determine which script, or plurality of scripts, should be executed in response to the event. The scripts may, in some instances, be maintained in the storage 502 of computing node 500. The scripts may be placed in the storage 502 in response to a determination that the computing node 500 should be associated with the script, e.g. be assigned the task of executing the associated trigger function when a related event is encountered. In a cluster of computing nodes, particular computing nodes may be selected for executing trigger functions for a particular collection of items, for a partition of the collection of items, and so forth.

The script processing module 508 may maintain information, typically in storage 502, that relates characteristics of the events to the scripts 504. In some instances, the information may comprise a mapping between a schema item, such as a table or partition identifier, and a script. Using this information, the script processing module 508 may respond to an event read off of the queue 512 by the stream processing module 506 by causing a script to be loaded into memory 510 and executed, so that the trigger function defined by the script may be performed. As depicted in FIG. 5, the executing script 514 may be monitored by a script monitoring module 518. The monitoring may comprise tracking how long the script takes to execute, how much memory and central processing unit ("CPU") cycles it consumes, and so forth. In some instances, this information may be supplied to a provisioning module (not shown) that can ensure appropriate billing in cases where the performance of the trigger function is supplied as a hosted service.

A script termination module 516 may also track (possibly with the assistance of script monitoring module 518) the performance of the executing script 514. The script termination module 516 may, if certain parameters are exceeded by the executing script 514, terminate execution of the script. For example, executing script 514 might be terminated after its execution time or input/output utilization exceeds a threshold value. The threshold value may be based on various factors, such as a level of resource consumption that might affect the performance perceived by other customers, by a quality-of-service level, and so forth.

Figure 6:
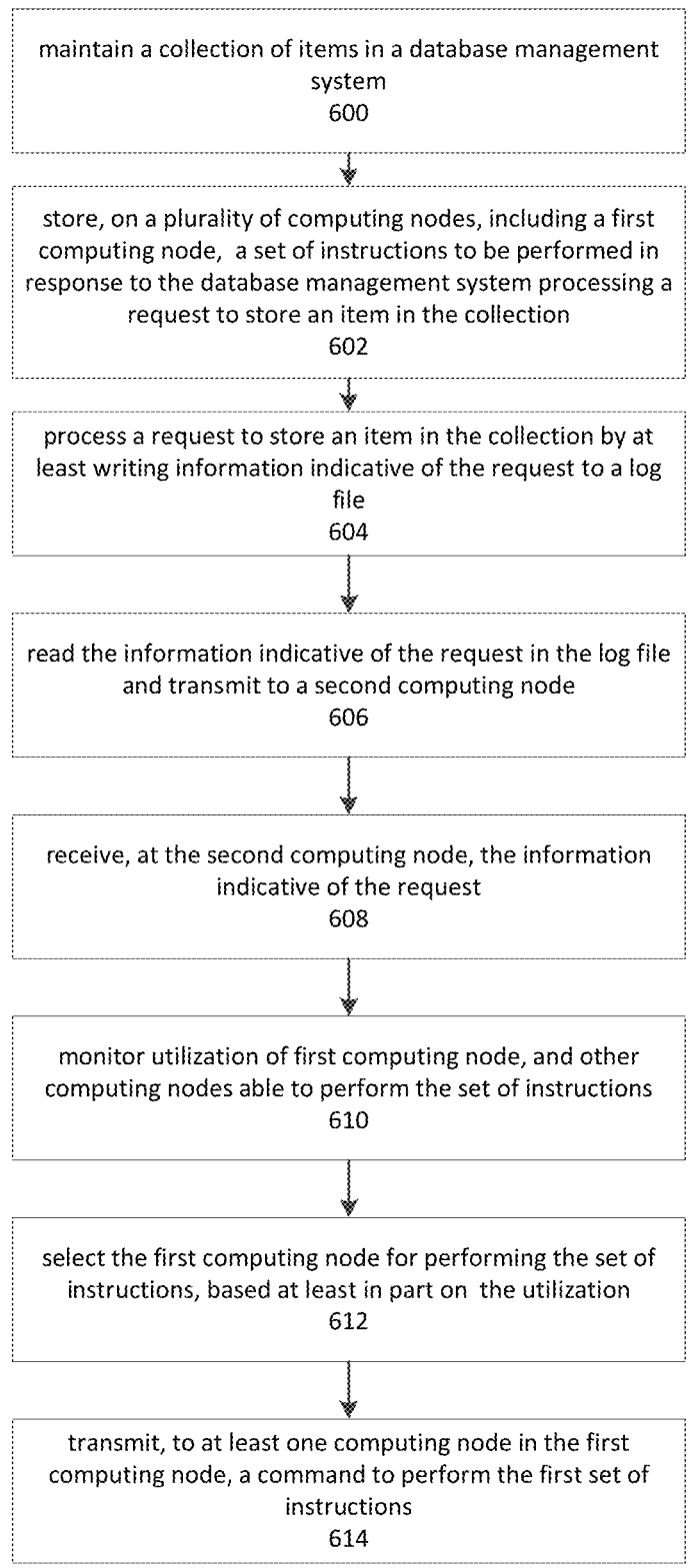
FIG. 6 is a flow diagram depicting executing trigger functions based on an event stream.

FIG. 6 is a flow diagram depicting a process for executing trigger functions based on an event stream. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 600 depicts maintaining a collection of items in a database management system. Each item may comprise a primary key and one or more additional values. An item may be referred to as a row, and the collection as a table. The collection (or table) may typically be associated with a name or other identifier. The identifier may be used, in some instances, to associate a script and the trigger function it defines with events that correspond to the table.

Block 602 depicts storing, on plurality of computing nodes including a first computing node, a set of instructions to be performed in response to the database management system processing a request to store an item in the collection. Storing an item may refer to inserting new items or to updating an existing item. The set of instructions may be defined in a script file as a trigger function. The set of instructions may be stored, for example as depicted by FIG. 5, in a memory of a computing node that is to perform the trigger function in response to various events, such as the request to store an item.

As depicted by block 604, the database management system may process a request to store an item in the collection by at least writing information indicative of the request to a log file. The information may then, as depicted by block 606, be read from the log file and transmitted to a second computing node. The second computing node may, for example, include the computing node 400 depicted in FIG. 4. Block 608 depicts that the second group of one or more computing nodes may receive the information indicative of the request.

The second computing node may, in some instances, receive the information indicative of the request in response to a determination that a primary key of the item is within a range of values. For example, the second computing node may be associated with a group of computing nodes in which each computing node in the group access a portion of the events recorded in the database log file. The portion accessed by each computing node may be based on the primary key of the item to which the event corresponds.

As depicted by block 610, the second computing node may monitor utilization of the plurality of computing nodes. The utilization may be monitored over time or may be spot-checked. Various utilization factors, such as input/output utilization, CPU utilization, and so forth, may be monitored. Computing nodes with less utilization may be favorable candidates for processing trigger functions. When utilization of the computing nodes rises above some threshold level, additional computing nodes may be added to the system. When utilization falls below some other threshold level, a computing node might be removed. These techniques allow the capacity for processing the triggers to be scaled.

Block 612 depicts selecting the first computing node, from the plurality of computing nodes, for performing the set of instructions. The selection may be based in part on the utilization level of the first computing node. In some instances, the first computing node may be selected when utilization is below a threshold level. In some cases, the first computing node may be selected based on its utilization relative to other computing nodes in the plurality of computing nodes.

Block 614 depicts transmitting, to the first computing node, data that is indicative of performing the first set of instructions. The transmitting is done in response to the selection of the first computing node for performing the set of instructions, as depicted by block 612.

Figure 7:
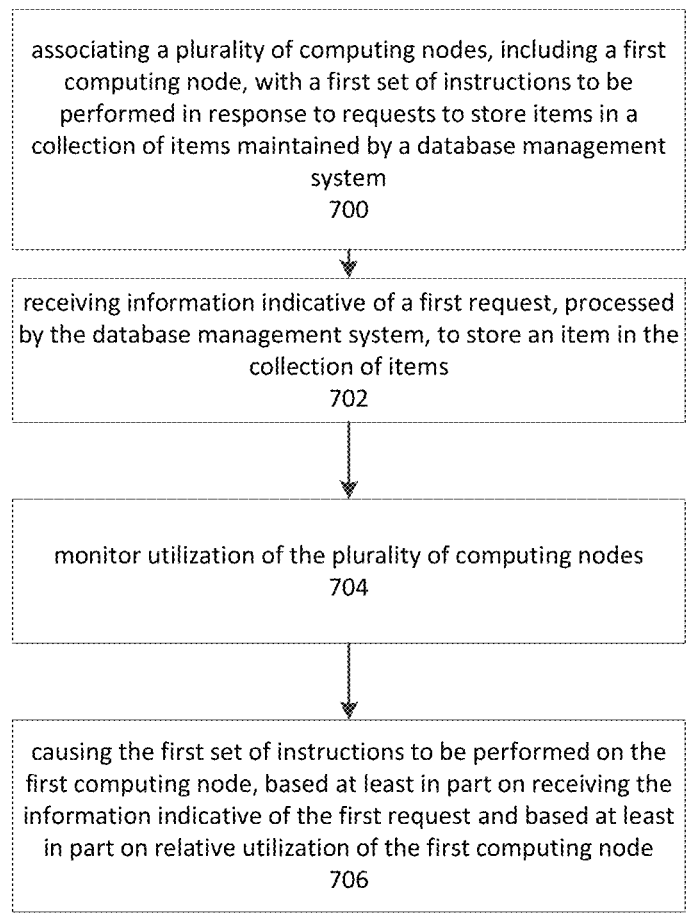
FIG. 7 is a flow diagram depicting a process for executing trigger functions based on an event stream.

FIG. 7 is a flow diagram depicting an additional embodiment of a process for executing trigger functions based on an event stream. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 700 depicts associating a plurality of computing nodes, including a first computing node, with a first set of instructions to be performed in response to requests to store items in a collection of items maintained by a database management system.

Block 702 depicts receiving information indicative of a first request, processed by the database management system, to store an item in the collection of items. The information may be received, directly or indirectly, from a log file of the database management system. The information might, for example, be read from a replica of the log file.

Block 704 depicts monitoring utilization of the plurality of computing nodes, including that of the first computing node. In various instances, utilization levels of the computing nodes may be used to select the least utilized computing node to handle performance of a trigger function. The utilization levels might also be used to determine when additional computing nodes should be added to the plurality of computing nodes. This may allow for scaling of the capability to execute trigger functions.

Block 706 depicts causing the first set of instructions to be performed on the first computing node, based at least in part on receiving the information indicative of the first request and based at least in part on the relative utilization of the first computing node, as compared to the other computing nodes that may be associated with the set of instructions. Causing the first set of instructions to be performed on the first computing node may involve transmitting data indicative of a command to perform the first set of instructions. The data may also include information about the update, such as the primary key of the affected item, the previous values of the item, and the current values of the item.

Figure 8:
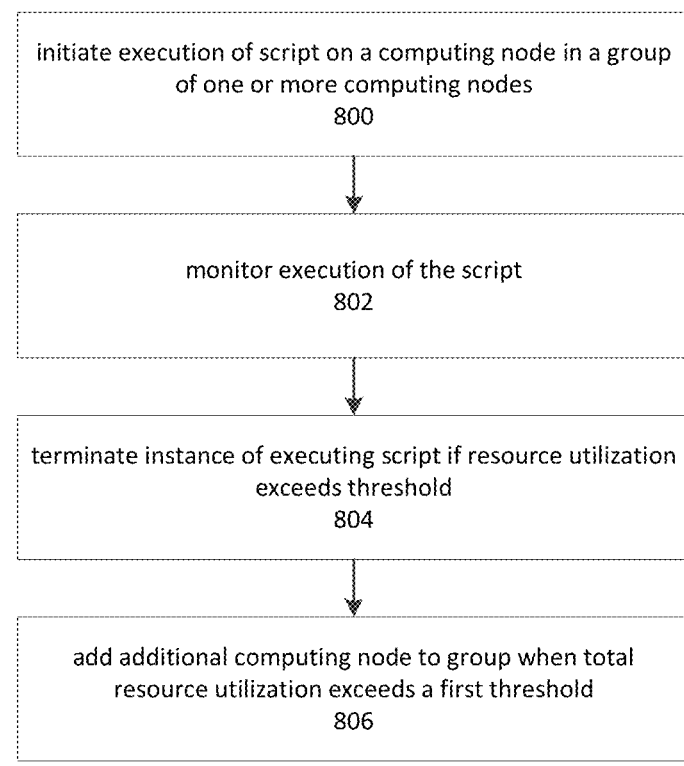
FIG. 8 is a flow diagram depicting execution of trigger functions on a group of one or more computing nodes.

FIG. 8 is a flow diagram depicting execution of trigger functions on a group of one or more computing nodes. Although depicted as a sequence of blocks, those of ordinary skill in the art will appreciate that the depicted order should not be construed as limiting the scope of the present disclosure and that at least some of the operations referred to in the depicted blocks may be altered, omitted, reordered, supplemented with additional operations, or performed in parallel. Embodiments of the depicted process may be implemented using various combinations of computer-executable instructions executed by a computing system, such as the computing systems described herein.

Block 800 depicts initiating execution of script on a computing node selected from a group of one or more computing nodes. A group of computing nodes may be made available to perform a trigger function as defined by the script. This may involve storing the script on the computing nodes, and may also involve further steps such as compiling the script to an executable form.

Note that although a group of computing nodes may be made available to perform the trigger function, the system may select a particular computing node from the group for performing all trigger functions related to a particular item. For example, a first series of updates might be made to an item $X_1$ of a table T, and a second series of updates to an item $X_2$ of the table T. The same trigger function might be applied in each case. Using the hash function and hash space mapping, the system might cause all of the invocations of the trigger function to be performed on a first computing node when the invocation relates to $X_1$, and all of the invocations of the trigger function related to $X_2$ to be performed on a second computing node.

The computing node selected for executing the script may receive a message indicating that it should execute the script. For example, as depicted in FIG. 5, a stream processing module 506 may receive the message and forward it to a script processing module 508. The script processing module 508 may then initiate execution of the script.

Block 802 depicts monitoring execution of the script. While the script is executing, the computing resources it consumes and the length of time it spends executing may be monitored. FIG. 5, for example, depicts a script monitoring module 518 that tracks various performance metrics related to the script, such as the time it spends executing, the memory and CPU cycles it consumes, and so on.

As depicted by block 804, the script may be terminated if its resource utilization exceeds a threshold value. The threshold value may be set based on various factors, such as an amount of resource utilization that would interfere with quality-of-service levels for other triggers, particularly those being executing for other tenants of the service.

Block 806 depicts adding additional computing node to group when total resource utilization exceeds a first threshold. The resource availability of a computing node may be monitored, and if resource utilization exceeds a threshold amount, an additional computing node may be added to the group. This may comprise splitting the hash space definitions into further subgroups, and assigning one of the subgroups to a new computing node. The system may ensure that all pending events pertaining to a particular item have been processed prior to performing the split.

Figure 9:
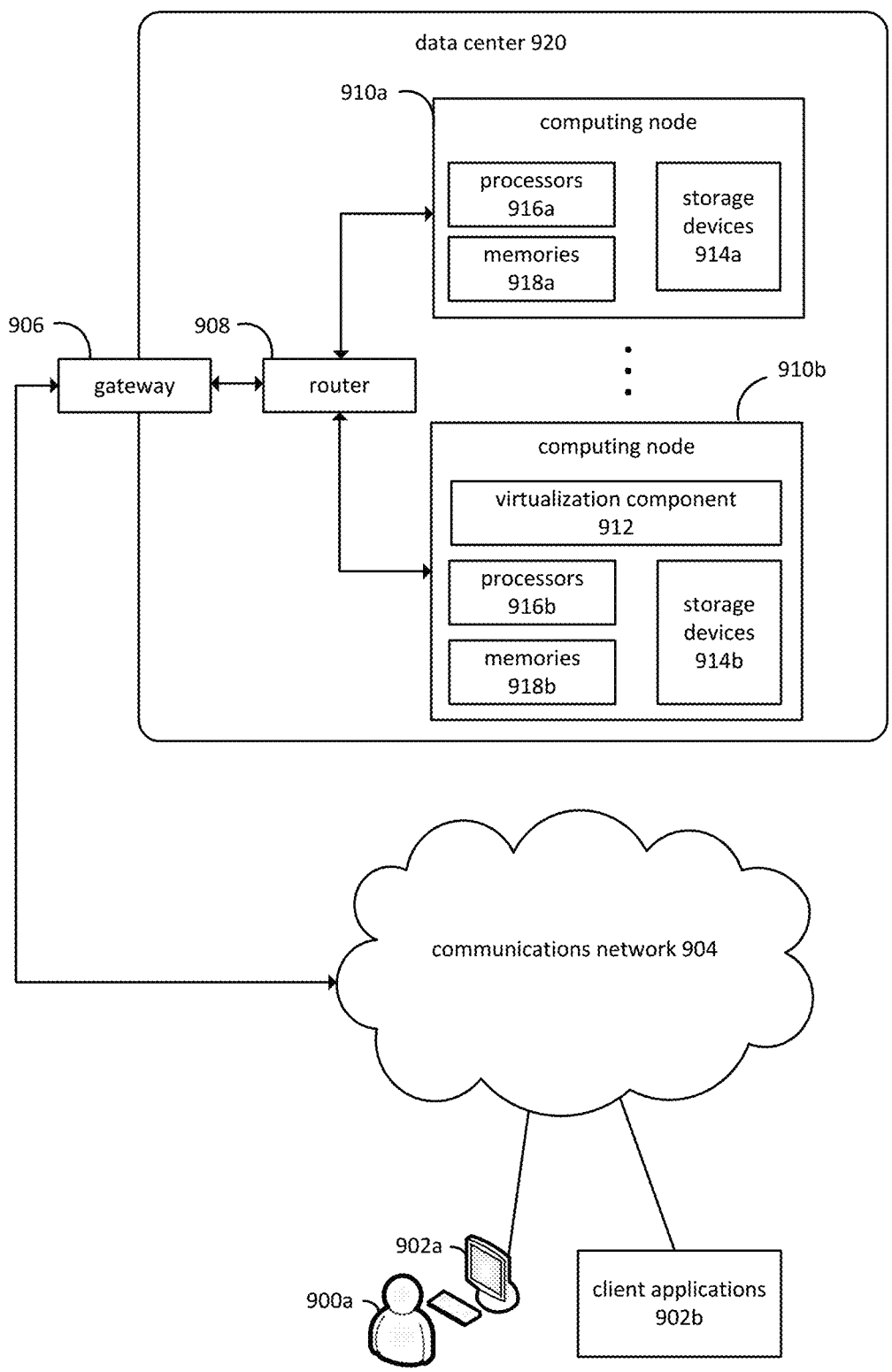
FIG. 9 is a block diagram depicting an embodiment of a computing environment in which aspects of the present disclosure may be practiced.

FIG. 9 is a diagram depicting an example of a distributed computing environment on which aspects of the present invention may be practiced. Various users 900a may interact with various client applications, operating on any type of computing device 902a, to communicate over communications network 904 with processes executing on various computing nodes 910a and 910b within a data center 920. Alternatively, client applications 902b may communicate without user intervention. Communications network 904 may comprise any combination of communications technology, including the Internet, wired and wireless local area networks, fiber optic networks, satellite communications, and so forth. Any number of networking protocols may be employed.

Communication with processes executing on the computing nodes 910a and 910b may be provided via gateway 906 and router 908. Numerous other network configurations may also be employed. Although not explicitly depicted in FIG. 9, various authentication mechanisms, web service layers, business objects, or other intermediate layers may be provided to mediate communication with the processes executing on computing nodes 910*a* and 910*b*. Some of these intermediate layers may themselves comprise processes executing on one or more of the computing nodes. Computing nodes 910*a* and 910*b*, and processes executing thereon, may also communicate with each other via router 908. Alternatively, separate communication paths may be employed. In some embodiments, data center 920 may be configured to communicate with additional data centers, such that the computing nodes and processes executing thereon may communicate with computing nodes and processes operating within other data centers.

Computing node 910*a* is depicted as residing on physical hardware comprising one or more processors 916*a*, one or more memories 918*a*, and one or more storage devices 914*a*. Processes on computing node 910*a* may execute in conjunction with an operating system or alternatively may execute as a bare-metal process that directly interacts with physical resources, such as processors 916*a*, memories 918*a*, or storage devices 914*a*.

Computing node 910*b* may comprise a virtualization component 912, which may include a virtual machine host and virtual machine instances to provide shared access to various physical resources, such as physical processors, memory, and storage devices. These resources may include the depicted processors 916*b*, memories 918*b*, and storage devices 914*b*. Any number of virtualization mechanisms might be employed to provide shared access to the physical resources.

The various computing nodes depicted in FIG. 9 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented without the use of virtualization, computing nodes may include one or more memories configured to store computer-readable instructions and one or more processors configured to read and execute the instructions. A computing node may also comprise one or more storage devices, network interfaces, communications buses, user interface devices, and so forth. Computing nodes may also utilize virtualized computing resources, such as virtual machines implemented with or without a hypervisor, virtualized bare-metal environments, and so forth. A virtualization-based computing node therefore encompasses both the virtualization resources and the physical hardware needed to execute the virtualization resources. A computing node may be configured to execute an operating system and application programs. In some embodiments, a computing node might also comprise bare-metal application programs.

Figure 10:
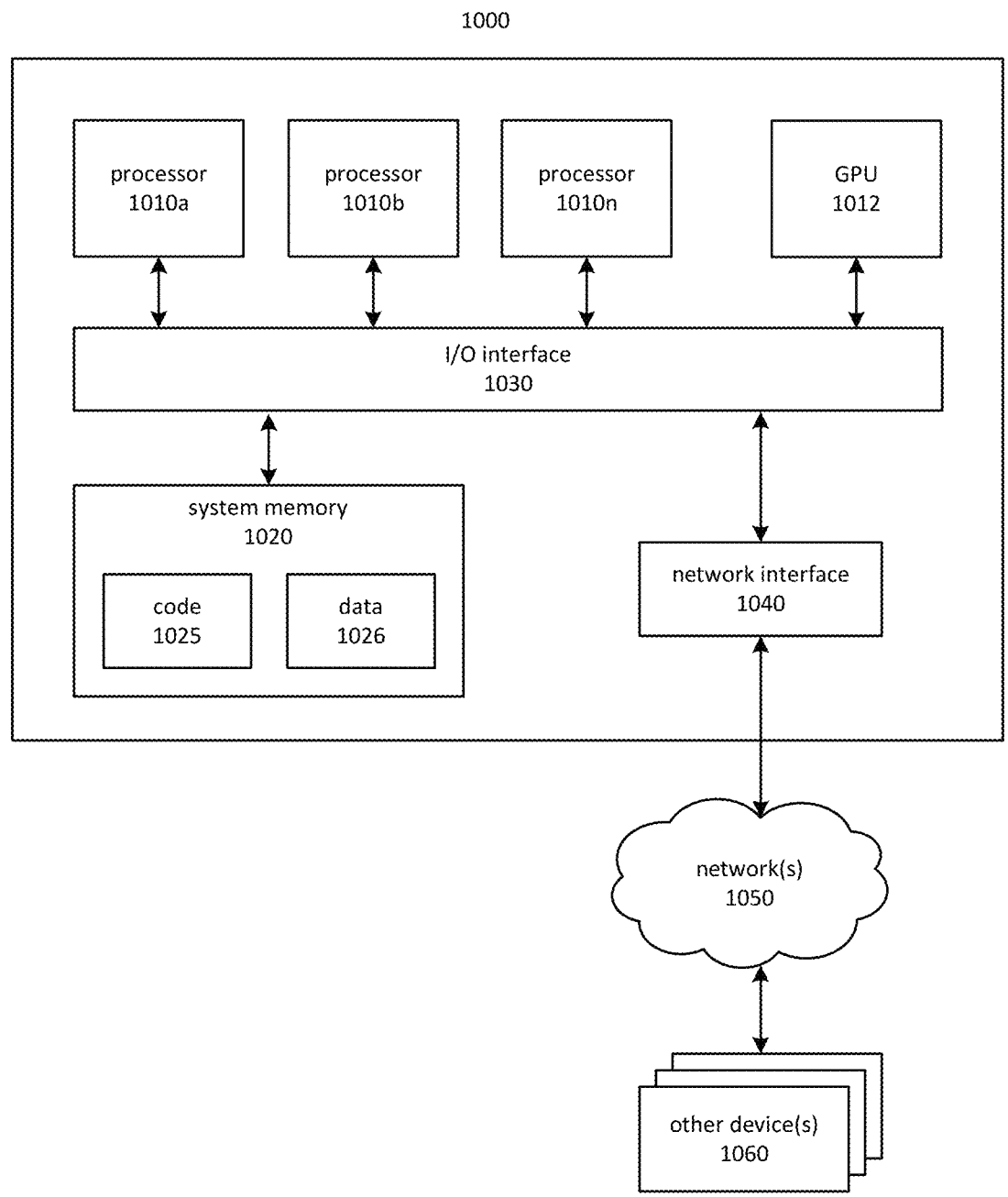
FIG. 10 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 10 depicts a general-purpose computer system that includes or is configured to access one or more computer-accessible media. In the illustrated embodiment, computing device 1000 includes one or more processors 1010*a*, 1010*b*, and/or 1010*n* (which may be referred herein singularly as a processor 1010 or in the plural as the processors 1010) coupled to a system memory 1020 via an input/output ("I/O") interface 1030. Computing device 1000 further includes a network interface 1040 coupled to I/O interface 1030.

In various embodiments, computing device 1000 may be a uniprocessor system including one processor 1010 or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures ("ISAs"), such as the x86, PowerPC, SPARC or MIPS ISAs, or any other suitable ISA. In multiprocessor systems, each of processors 1010 may commonly, but not necessarily, implement the same ISA.

In some embodiments, a graphics processing unit ("GPU") 1012 may participate in providing graphics rendering and/or physics processing capabilities. A GPU may, for example, comprise a highly parallelized processor architecture specialized for graphical computations. In some embodiments, processors 1010 and GPU 1012 may be implemented as one or more of the same type of device. In some instances, the GPU 1012 may perform calculations and execute instructions in cooperation with or in place of the processor 1010. Accordingly, as used herein, the term processor may encompass a GPU. Similarly, other highly parallelized processor architectures that supplement or replace the operation of the primary processor 1010 are also encompassed by the term processor.

System memory 1020 may be configured to store instructions and data accessible by processor(s) 1010. In various embodiments, system memory 1020 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques, and data described above, are shown stored within system memory 1020 as code 1025 and data 1026.

In one embodiment, I/O interface 1030 may be configured to coordinate I/O traffic between processor 1010, system memory 1020, and any peripherals in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect ("PCI") bus standard or the Universal Serial Bus ("USB") standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computing device 1000 and other device or devices 1060 attached to a network or networks 1050, such as other computer systems or devices, for example. In various embodiments, network interface 1040 may support communication via any suitable wired or wireless general data networks, such as types of Ethernet networks, for example. Additionally, network interface 1040 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 1020 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 1000 via I/O interface 1030. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 1000 as system memory 1020 or another type of memory. Further, a computer-accessible medium may include transmission media or signals, such as electrical, electromagnetic or digital signals, conveyed via a communication medium, such as a network and/or a wireless link, such as those that may be implemented via network interface 1040. Portions or all of multiple computing devices, such as those illustrated in FIG. 10, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

The computing device 1000 may be configured by software instructions to contain a module (not shown). A module is a component of the computing device 1000 that includes a set of instructions, loaded in whole or in part into system memory 1020, for performing a set of related functions, including input and output with other modules. The code 1025 and data 1026 of system memory 1020 are altered by the loading of the instructions. The operation of a module is effected by interchange between processor 1010, or in a multiprocessor system 1010a-1010n and/or GPU 1012, and the system memory 1020 via I/O interface 1030. A module may interact with other modules of the computing device 1000 via system memory 1020, and with other devices 1060 via network interface 1040 and network 1050.

A compute node, which may be referred to also as a computing node, may be implemented on a wide variety of computing environments, such as tablet computers, personal computers, smartphones, game consoles, commodity-hardware computers, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, instructions executed by one or more computers or computer processors. The instructions may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage, such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software instructions and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the instructions, systems, and data structures may also be stored (e.g., as software instructions or structured data) on a computer-readable medium, such as a hard disk, a memory, a network, or a portable media article to be read by an appropriate device or via an appropriate connection. The instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:
1. A database management method, comprising:
   associating a plurality of computing nodes, including a computing node, with a set of instructions to be performed in response to a request to store an item in a collection of items maintained by a database system;
   obtaining information associated with the request to store the item in the collection of items;

in response to obtaining the information, causing the computing node to obtain the set of instructions based at least in part on resource utilization of the plurality of computing nodes; and causing the set of instructions to be performed by the computing node, wherein causing the computing node to perform the set of instructions at least in part balances workload distribution across the plurality of computing nodes.

2. The method of claim 1, further comprising:

causing the set of instructions to be performed on an additional computing node of the plurality of computing nodes based at least in part on resources utilized by the computing node in performing the set of instructions.

3. The method of claim 1, wherein causing the computing node to obtain the set of instructions is based at least in part on determining that resource utilization of the computing node is less than resource utilization of another computing node of the plurality of computing nodes.

4. The method of claim 1, wherein causing the computing node to obtain the set of instructions is based at least in part on determining that resource utilization of the computing node is less than resource utilization of each of other computing nodes of the plurality of computing nodes.

5. The method of claim 1, further comprising:

halting performance of the set of instructions based at least in part on resources utilized by the computing node in performing the set of instructions.

6. The method of claim 5, wherein halting performance of the set of instructions is based on determining that resource utilization of the computing node exceeds a threshold amount.

7. The method of claim 1, further comprising:

causing a plurality of sets of instructions, including the set of instructions, to be executed in response to obtaining information associated with the request.

8. The method of claim 1, further comprising:

storing information indicative of an association between a plurality of sets of instructions and a hash space, the plurality of sets of instructions including the set of instructions; and causing each of the plurality of sets of instructions associated with the hash space to be executed in response to obtaining information associated with the request.

9. A non-transitory computer-readable storage medium having stored thereon instructions that, upon execution by one or more computing devices, cause the one or more computing devices at least to:

associate a plurality of computing nodes, including a computing node, with a set of instructions to be performed in response to a database system obtaining a request to store an item in a collection of items;

in response to the request, cause the computing node to obtain the set of instructions based at least in part on resource utilization of the plurality of computing nodes; and cause the set of instructions to be performed by the computing node, wherein causing the computing node to perform the set of instructions at least in part supports equalization of workload distribution across the plurality of computing nodes.

10. The non-transitory computer-readable storage medium of claim 9, comprising further instructions that, upon execution by the one or more computing devices, cause the one or more computing devices to at least:

store information indicative of an association between a plurality of sets of instructions and a hash space, the plurality of sets of instructions including the set of instructions; and cause each of the plurality of sets of instructions associated with the hash space to be executed in response to the request.

11. The non-transitory computer-readable storage medium of claim 9, wherein causing the computing node to obtain the set of instructions is based at least in part on determining that resource utilization of the computing node is less than resource utilization of another computing node of the plurality of computing nodes.

12. The non-transitory computer-readable storage medium of claim 9, comprising further instructions that, upon execution by the one or more computing devices, cause the one or more computing devices to at least:

determine to halt performance of the set of instructions based at least in part on resources utilized by the computing node in performing the set of instructions.

13. The non-transitory computer-readable storage medium of claim 9, wherein the set of instructions are included in a script, wherein the script comprising the set of instructions is a trigger function executable by the computing node.

14. The non-transitory computer-readable storage medium of claim 9, wherein the set of instructions comprises at least a primary key of the item and a prior value of the item or a new value of the item.

15. A database management system, comprising:

a collection of items in a storage associated with the database management system, wherein the database management system processes a request to store an item in the collection of items; and a plurality of computing nodes, including a computing node, having access to a set of instructions executable in response to the database management system processing the request, the computing node to:

obtain the set of instructions based at least in part on resource utilization of at least one of the plurality of computing nodes; and execute the set of instructions to support balancing workload distribution across the plurality of computing nodes.

16. The database management system of claim 15, wherein the set of instructions corresponds to at least a function of parameters comprising at least one of a primary key of the item, a prior value of the item, or a new value of the item.

17. The database management system of claim 15, further comprising an additional computing node to:

monitor resource utilization of the computing node; and select the computing node, of the plurality of computing nodes, to execute the set of instructions based at least in part on the resource utilization of the computing node.

18. The database management system of claim 15, wherein the computing node obtains the set of instructions based, at least in part, on resource utilization of the computing node being less than an additional computing node of the plurality of computing nodes.

19. The database management system of claim 15, wherein the set of instructions are included in a script, wherein the script comprising the set of instructions is a trigger function executable by the computing node.

* * * * *